Oct. 6, 1970  H. J. SCHULZ ET AL  3,532,850

POWER SUPPLY FOR ELECTRICAL DISCHARGE MACHINING

Filed July 27, 1966  7 Sheets-Sheet 1

INVENTORS
Victor H. Marcolini,
Hans J. Shulz
BY
Carmen, Dickey & Pierce
ATTORNEYS.

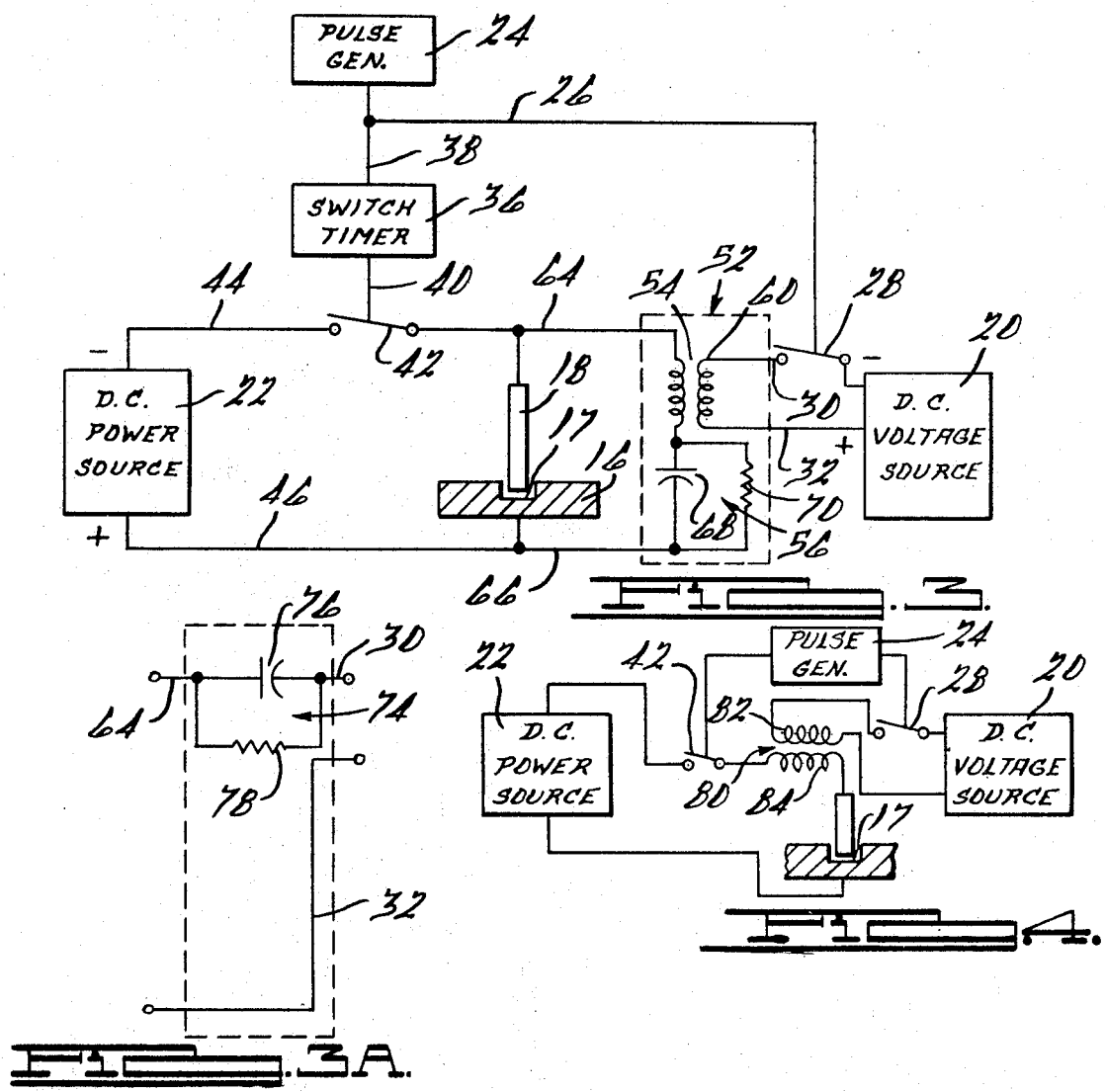

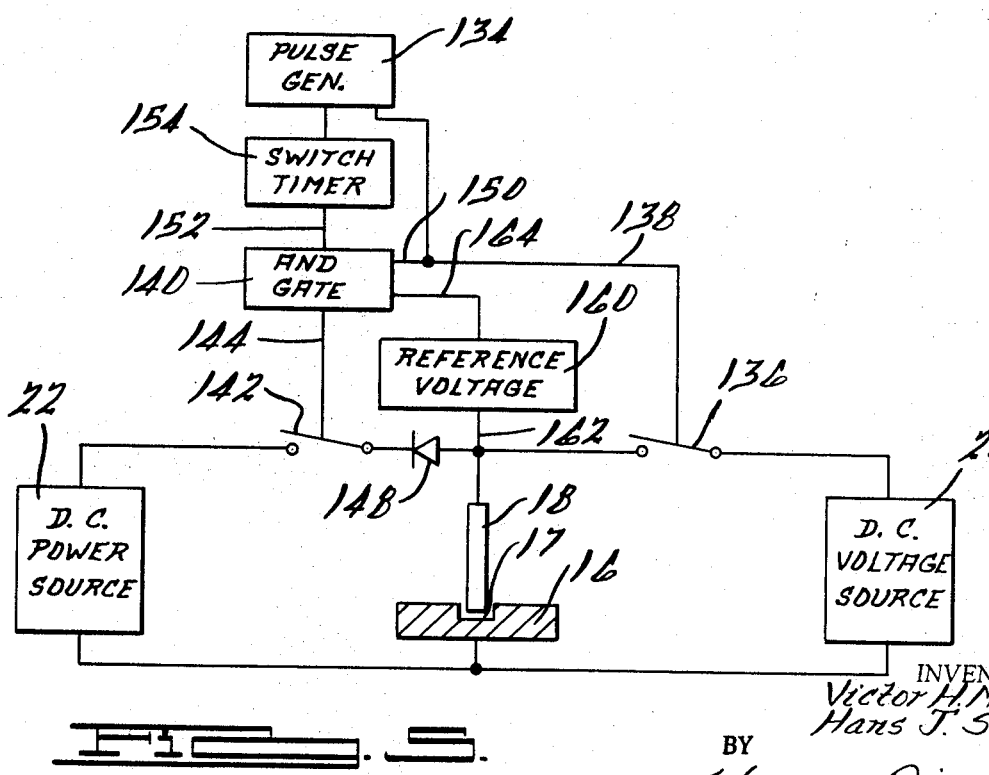

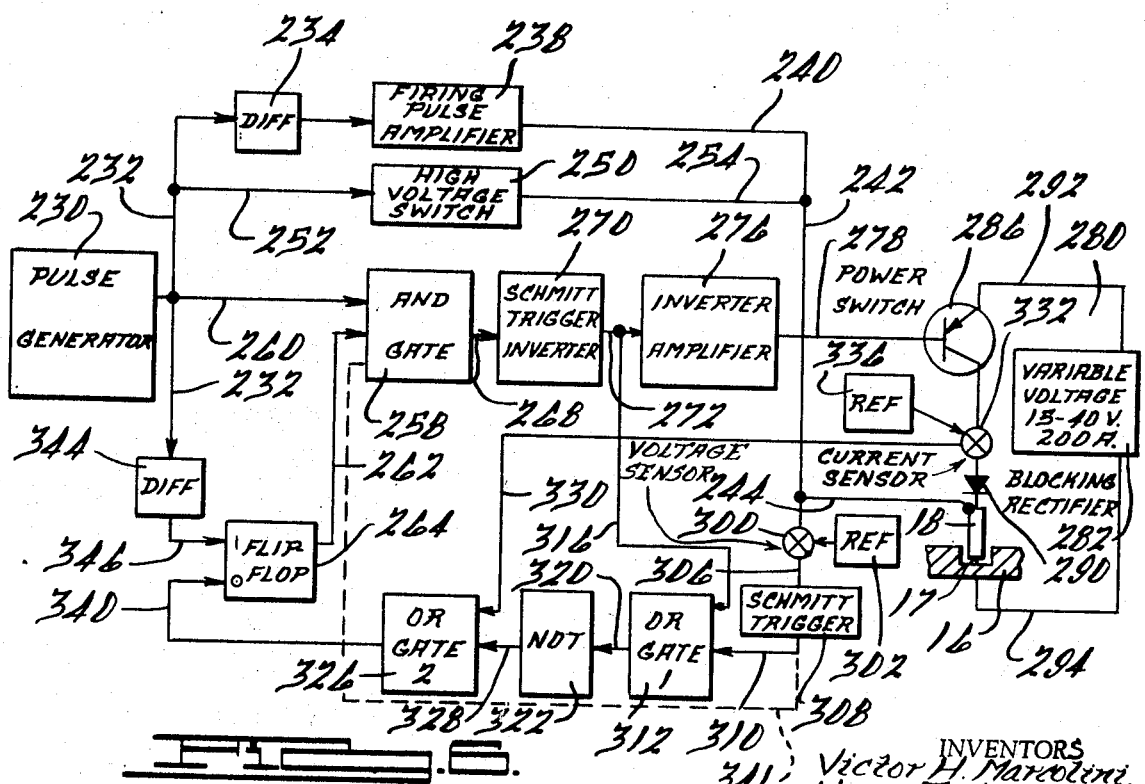

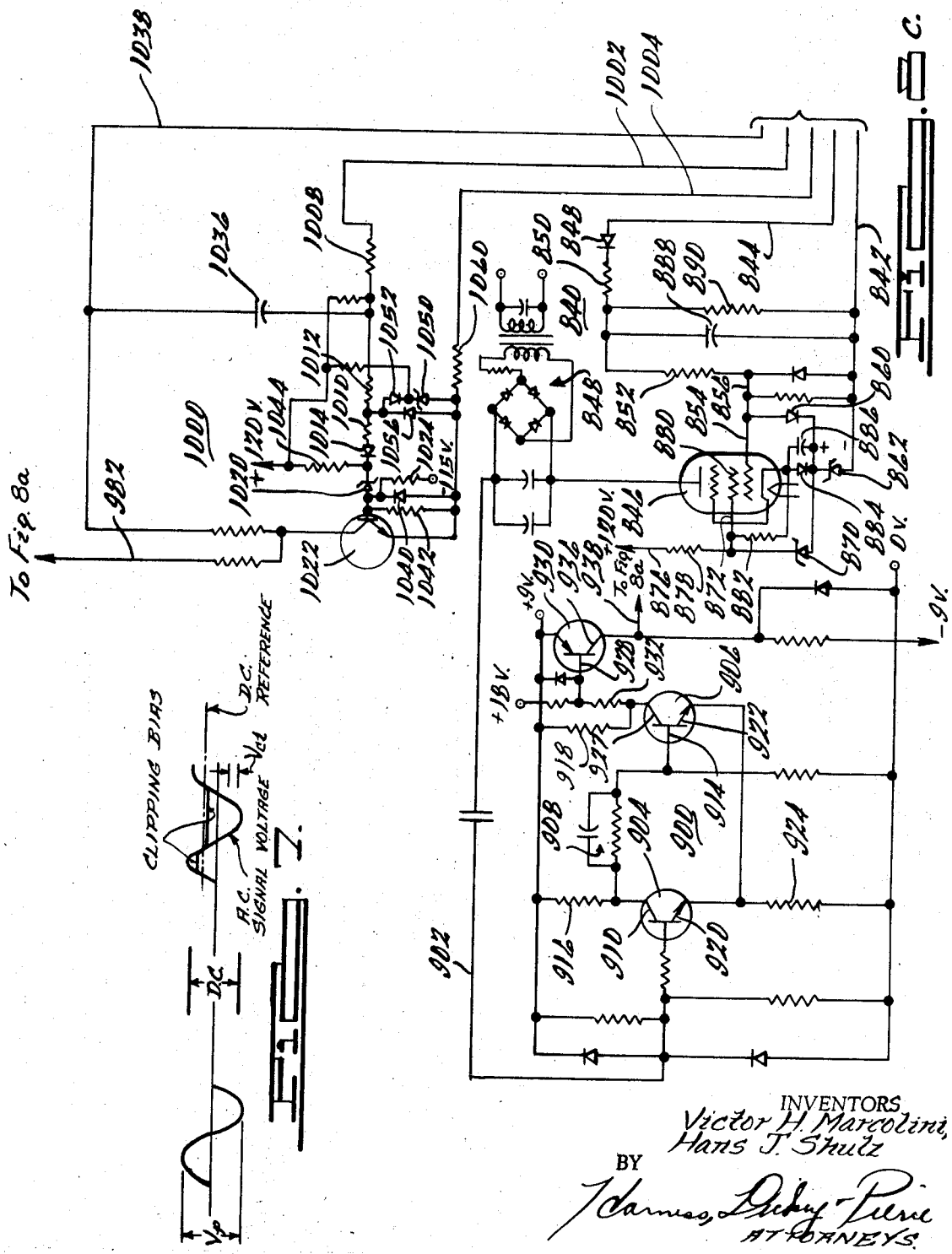

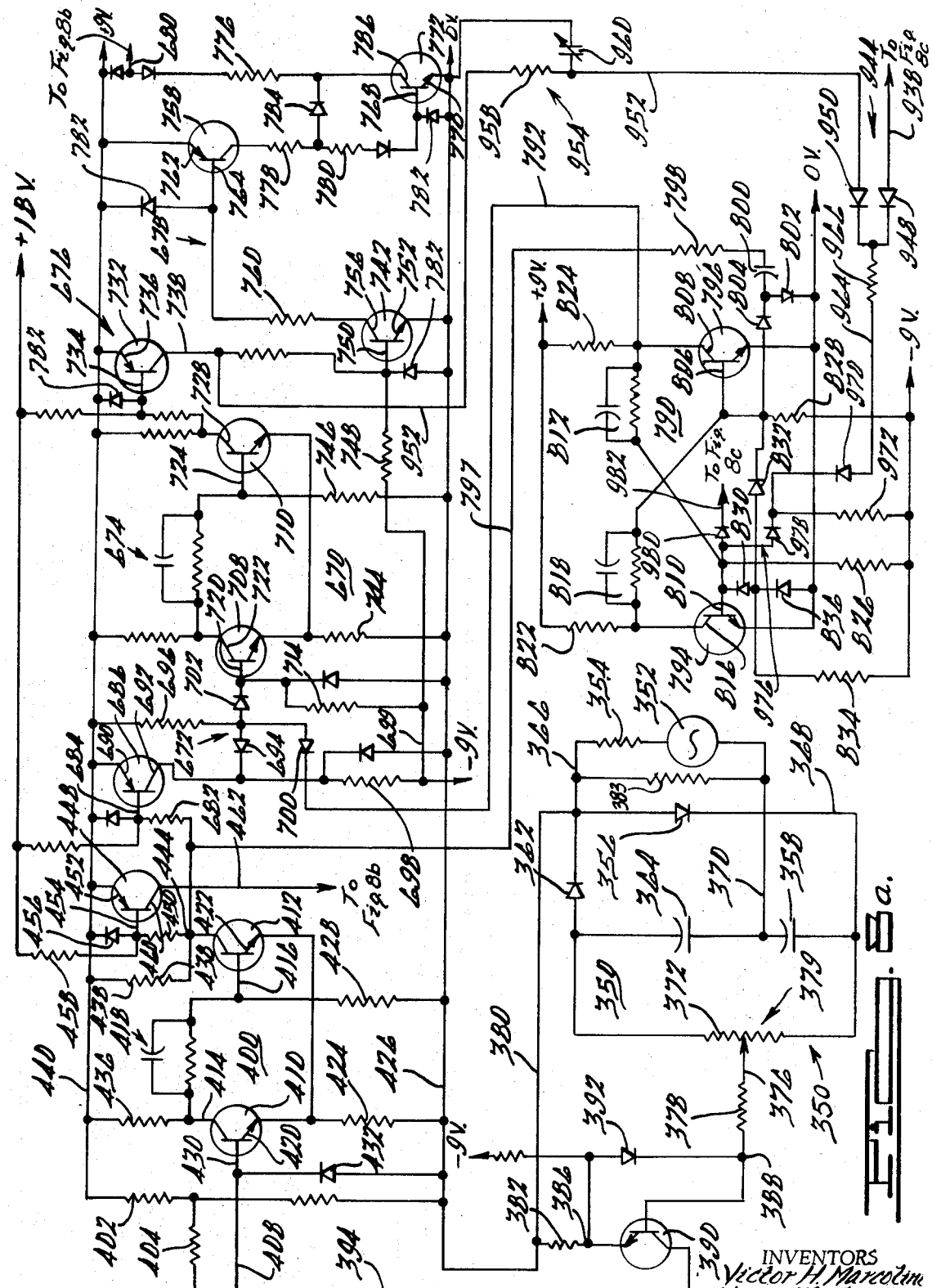

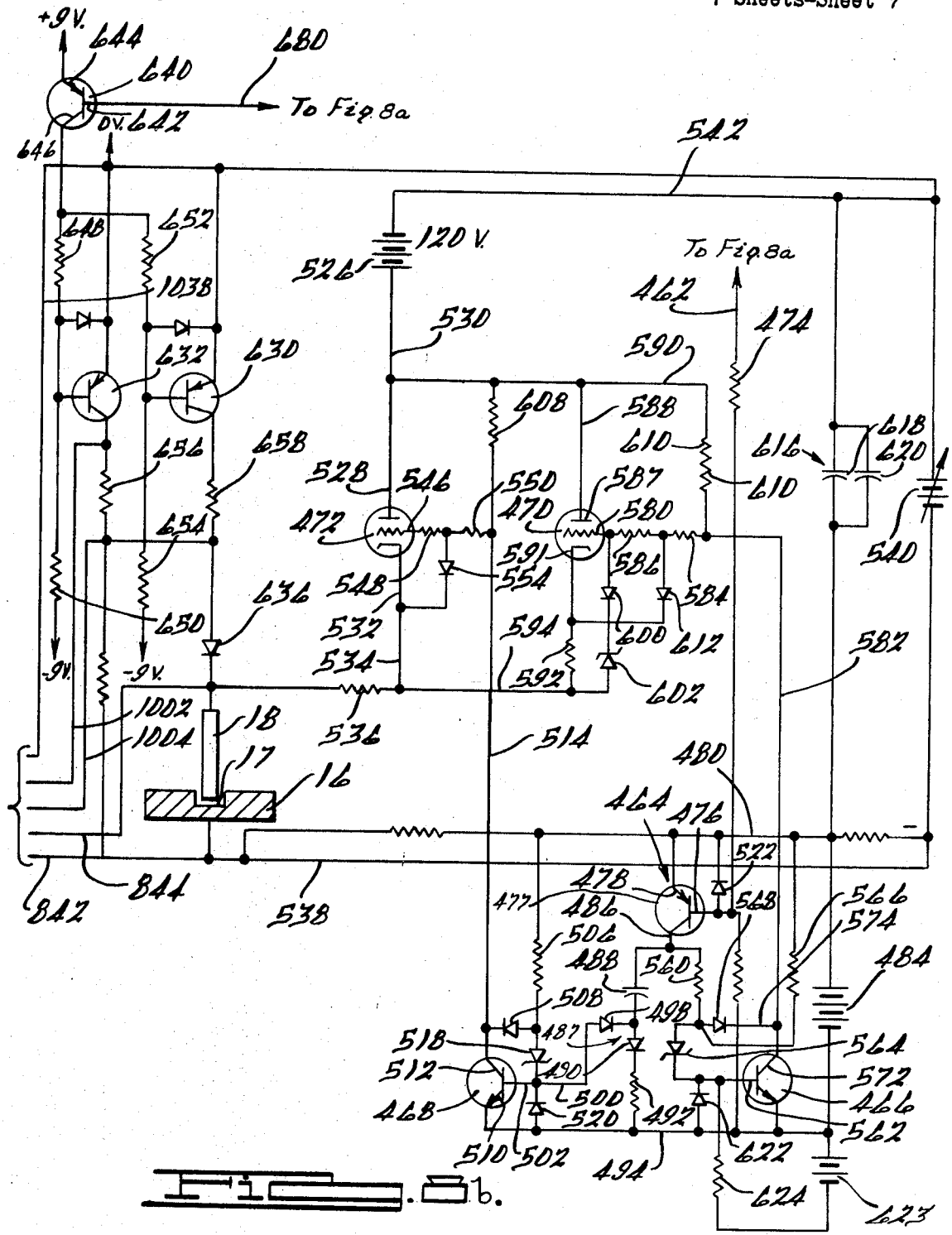

United States Patent Office 3,532,850
Patented Oct. 6, 1970

3,532,850
POWER SUPPLY FOR ELECTRICAL
DISCHARGE MACHINING
Hans J. Schulz, Wuppertal-Vohwinkel, Germany, and Victor H. Marcolini, Cicero, Ill., assignors, by mesne assignments, to Amsted Industries Incorporated, Chicago, Ill., a corporation of Delaware
Filed July 27, 1966, Ser. No. 576,168
Int. Cl. B23p 1/08
U.S. Cl. 219—69
21 Claims

ABSTRACT OF THE DISCLOSURE

An electrical discharge machining power supply for eroding material from a conductive workpiece by passing successive pulses through an ionizable gap defined between an electrode tool and the workpiece, in which separate sources of gap ionizing potential and material eroding energy, which have internal impedance characteristics selected to approximate the impedance characteristics of the gap in its unionized and ionized states, respectively, are selectively coupled across the gap through respective electronic switches, which are controlled by pulses supplied from a single variable frequency and variable duty cycle pulse generator. In one embodiment, the sequencing is effected by a timer which delays the operation of the high power switch for a predetermined period. The timer may be replaced by or used in combination with a diode which is connected in series with the power switch and poled to block conduction therethrough until the gap ionizing process has reached some predetermined point, whereby attenuation of the gap ionizing potential is positively precluded. In another embodiment, the sequencing is effected by the blocking diode alone. In a detailed embodiment, a pair of high voltage switches are provided for coupling the source of gap ionizing potential across the gap. One of the high voltage switches is operated by a differentiated version of the control pulse and, therefore, has a very fast response time so that a burst of the gap ionizing potential is applied across the gap at the very outset of each control pulse to thereby charge the gap capacitance and at least initiate the gap ionizing process. The other of the high voltage switches has a slower response time, but maintains the gap ionizing potential across the gap for any period up to the full duration of the control pulse and, therefore, assures full ionization of the gap at some time during most all control pulses under normal machining conditions. Also, undervoltage and overcurrent cut-off circuits, both of which are generally responsive on a per-pulse basis, though the former is relatively slow acting while the latter is relatively fast acting, are provided to interrupt the machining process in the event that the voltage across the gap drops below some predetermined level or the current therethrough rises above some predetermined level.

---

This invention generally relates to the machining of metals and other conductive materials by the utilization of spark discharge between a workpiece and a tool electrode, and more specifically to an improved method and apparatus for supplying electrical energy to a work gap between a workpiece and the tool electrode to effect removal of material from the workpiece by an electrical discharge machining process.

In electrical discharge or spark machining processes, commonly referred to as EDM process, a tool electrode and workpiece to be machined are spaced, one from the other, to form a work gap. The tool electrode and workpiece are associated with an electrical control circuit including a source of electrical energy whereby an electrical discharge or arc is produced across the work gap for removing metal from the workpiece in a predetermined configuration. The work gap between the tool electrode and the workpiece is generally occupied by a dielectric medium as, for example, a dielectric fluid, and the electrical arc utilized in the machining process passes through this medium. In accomplishing the erosion of metal from the workpiece by the electrical arc, the gap must first be ioninzed to provide a path through the work gap, commonly known as ionizing the gap, and then material removing energy is passed through the gap to actually machine the workpiece.

In performing the electrodischarge machining process, it has been found that the most efficient use of the electrical energy being supplied to the gap occurs when the gap is initially supplied with a high voltage, high impedance, low current and low power source for the purpose of ionizing the gap and subsequently with electrical energy having the characteristics of low voltage, high current, and high power to supply the material removing energy. In this way the gap is supplied with electrical energy in which the energy is most efficiently transferred due to the close matching of the impedance of the gap to the source of electrical energy. Accordingly, it is desirable to initially ionize the gap with a power source having the electrical characteristics described above for ionizing purposes and thence to supply the material for moving energy to the gap in accordance with the second set of characteristics described above.

An object of the present invention is to provide a new and improved power supply for passing successive pulses through an ionizable gap defined between an electrode tool and a conductive workpiece for electrical discharge-type machining of the workpiece, the power supply being of the type that includes separate sources of gap ionizing potential and material eroding energy which have internal impedance characteristics selected to approximate the impedance characteristics of the gap in its unionized and ionized states, respectively.

Another object of the present invention is to provide new and improved current cut-off circuitry for an electrical discharge machining power supply to protect the power supply from the potentially damaging consequences of a short circuit or the like between the electrode and workpiece. A more detailed related object is to provide current cut-off circuitry for an electrical discharge machining power supply which is effective to cut-off the power supply in response to the voltage across the gap dropping below some predetermined level or to the current through the gap rising above some other predetermined level. Another detailed related object of this invention is to provide current cut-off circuitry of the foregoing type which cuts off the power supply only after at least a short burst of material eroding energy has passed through the gap, so that conditions causing an abnormally low gap voltage or high gap current, such as a collection of debris in the gap or a burr on the workpiece, can be cleared without completely shutting down the power supply. An even more detailed related object is to provide current cut-off circuitry of the foregoing type that has a relatively slow response to abnormally low gap voltages and a relatively fast response to abnormally high gap currents.

Still another object of the present invention is to provide an electrical discharge machining power supply of the foregoing type which is highly reliable and relatively simple and which is fully compatible with a wide variety of the servo mechanisms conventionally employed in electrical discharge machines to maintain a substantially constant gap spacing between the electrode and workpiece.

Further objects, features and advantages of this invention will become apparent from a consideration of the following description, the appended claims and the accompanying drawings in which:

FIG. 3 is a schematic diagram illustrating another embodiment of the present system wherein an additional coupling circuit has been added to the system of FIG. 1;

FIG. 3a is a schematic diagram of an alternative form of the coupling circuit illustrated in FIG. 3;

FIG. 4 is a schematic representation of a further modified coupling circuit which may be utilized in the system of FIG. 3 in lieu of the coupling circuit illustrated in dotted lines thereof;

FIG. 5 is a schematic diagram of another embodiment of the present system wherein gating means is utilized to control one of the switches, the gating means being responsive to a plurality of conditions in the system, such as the gap voltage, the condition of a second switch and the presence of a timed signal;

FIG. 6 is a schematic diagram of still a further embodiment of the present system illustrating certain other features of the present invention in addition to incorporating circuit features illustrated in FIGS. 1 to 5;

FIG. 7 is a wave form diagram of the output waves at various points in a preferred pulse generator of the present system;

FIG. 8a is a schematic diagram illustrating the specific details of a portion of the schematic diagram of FIG. 6;

FIG. 8b is a schematic diagram illustrating the specific details of another portion of the schematic diagram of FIG. 6;

FIG. 8c is a schematic diagram illustrating the specific details of still another portion of the schematic diagram of FIG. 6.

Figure 1:
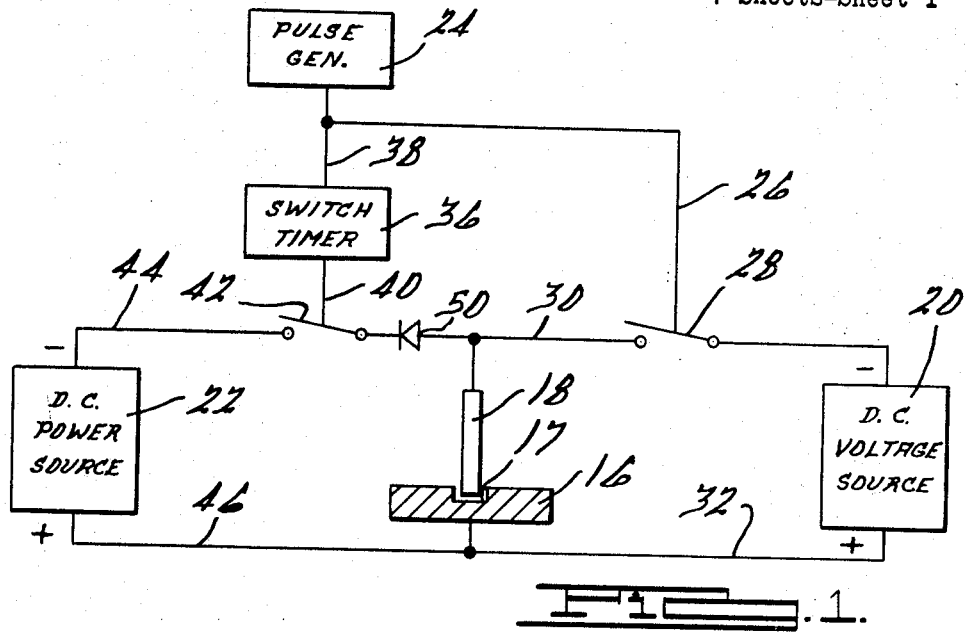
FIG. 1 is a schematic diagram illustrating a basic concept of the present system in which a plurality of sources of electrical energy are utilized to provide electrical energy to a single electro-discharge machining gap.

Referring now to the drawings, and particularly to FIG. 1, there is representatively illustrated an electro-discharge machining system including a work gap 17 formed by the spacing between a workpiece 16 and a tool electrode 18. As stated above, it has been found that the use of a single power supply to both break down the gap, referred to ionization of the gap, and also provide the energy to erode the material from the workpiece results in an inefficient operation of the power supply. This inefficiency arises due to the fact that a relatively large source of power having a high voltage capability is required to perform both functions, thus inefficiently utilizing the power supply during a portion of the cycle. Accordingly, a high voltage, high impedance, low power source 20 is provided to supply the potential required for initially ionizing the gap, and a low voltage, high current, high power source 22 is provided to supply the energy required for removing or eroding material from the workpiece 16.

In the circuit illustrated in FIG. 1, a pulse generator 24 initially provides a control pulse to actuate a switch 28 connected in circuit between the source 20 and gap 17, thereby completing the circuit between the high voltage, low power source 20 and the workpiece 16 and tool electrode 18. The switch is connected to a conductor 30 and the source of high voltage is connected to the workpiece 16 by means of a conductor 32. The high voltage source is of the order of 120 to 150 volts D.C. to provide sufficient potential to initially ionize the gap. The pulse generator also feeds a pulse to a switch timer 36, which may take any one of a variety of forms, through a conductor 38 to provide an energizing pulse to the switch timer 36. The switch timer 36 accordingly provides an output pulse at conductor 40 and thence to a switch 42 to actuate or close switch 42 at some time subsequent to the closure of switch 28. The closure of switch 42 connects the gap 17 to the low voltage, high power source 22 by means of conductors 44, 46. The source 22 is preferably of the order of 40 to 50 volts D.C., approximately one-third of the voltage of source 20, and less than the breakdown potential of the gap 17.

The timed output pulse on conductor 40 in the preferred embodiment, follows the energization of switch 28 by a predetermined, selectable time interval. This interval may be related to the probability of the gap 17 being ionized after a predetermined period of energization of the gap 17 from source 20. However, if the gap 17 has not been ionized, the low power pulse will not ionize the gap nor remove any appreciable amount of material from the workpiece 16 until such time as the gap is broken down or ionized by means of a subsequent pulse generated through the actuation of switch 28 by pulse generator 24.

As was stated above, the direct current power source 22 is preferably capable of delivering a voltage of approximately 40 to 50 volts through switch 42, 18 to 32 volts being the normal ionization voltage for EDM systems. The switch 42 is ordinarily a high power, fast switching device. The workpiece 16 and tool electrode 18 are mounted in the normal manner in an electro-discharge machine setup and are preferably submerged in a dielectric coolant. The dielectric coolant is adapted to carry away the metallic particles removed from the workpiece 16 and also maintain the surface of both the workpiece 16 and tool electrode 18 below melting temperature.

In the normal situation, the position of the electrode 18 is automatically controlled relative to the workpiece 16 by means of a servo mechanism (not shown) in such a manner that the gap 17, during normal cutting operations, remains rather constant. For this purpose any of the known power feed servo mechanisms may be utilized and any of the conditions of the work gap 17 may be sensed to control the operation of the power feed servo system, as for example, average power, average voltage, peak voltage, etc. Also, the switches 28 and 42 may take any form, as for example and citing only two of the several available, a transistor or a vacuum tube. The delay device or switching timer 36 provides the sequential action of the switches 28, 42 to permit the voltage source 20 to initially ionize the gap, and the power source 22 to supply the high power, material removing pulse to the gap 17.

The delaying of the closing of switch 42 and the high open circuit impedance thereof decouples the high power D.C. source 22 from the gap circuit during an initial gap ionizing period. This decoupling operation has an inherent characteristic of presenting a high impedance load for the initial ionization pulse fed from the high voltage, low power voltage source 20, thereby enhancing the breakdown characteristics of the gap. It is to be noted that to provide for the efficient transfer of energy from the sources 20 and 22 to the gap 17, the high impedance of the high voltage source 20 may be chosen to closely match to the deionized impedance of the gap 17, while the low impedance of the high power source 22 may be chosen to closely match the ionized impedance of the gap 17.

Figure 2:
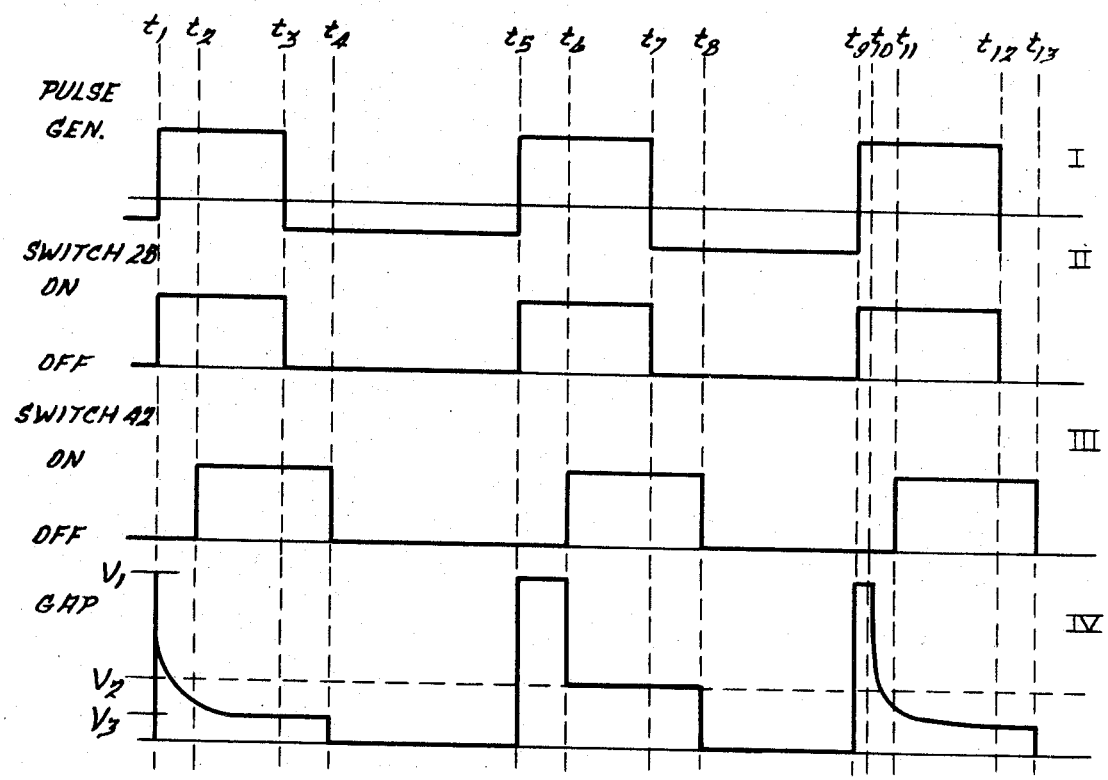
FIG. 2 is a timing chart illustrating the relationship of voltage with respect to time of the pulse generator, the pair of switches and the gap illustrated in FIG. 1.

Referring now to FIG. 2, there is shown a timing diagram and which illustrates the sequential action of the switches, as referenced to and taken in conjunction with the output wave of the pulse generator. Referring to the first voltage versus time diagram, which is illustrative of the pulses generated in the pulse generator, it is seen that a series of pulses are provided which start from a predetermined low voltage and advance to a predetermined positive voltage between times T1–T3, T5–T7, T9–T12. Referring to the first pulse, as illustrated in diagram I and taken in conjunction with the "switch 28" diagram illustrated in diagram II, it is seen that the switch 28 is turned on immediately at time T1, the pulse illustrated being the pulse impressed on conductor 26. At time T3 the pulse impressed on switch 28 terminates and the switch 28 reopens.

In diagram III, relating to switch 42, it is seen that the pulse fed to switch 42 is delayed a prespecified time between T1 and T2 and, at time T2, a pulse is impressed on conductor 40 to close switch 42. The pulse being impressed on switch 42 has been chosen to be of a predetermined duration and persists beyond the opening of switch 28 to thereby impress the low voltage, high power source on work gap 17 between time T2 and T4. As illustrated in diagram IV, the gap initially starts at some voltage V1 or the deionized voltage of the gap. Upon the energization of the gap by the high voltage, lower power source 20, the gap commences ionization and accordingly drops the gap voltage along a predetermined characteristic curve to an ionized voltage V3. Prior to reaching the ionized voltage V3, the high power source 22 is impressed on the gap through the switch 42. With the gap 17 ionized, the low voltage, high energy source feeds power through the gap to remove metal from the workpiece 16.

Referring to the second set of diagrams, there is illustrated the timing sequence in a situation wherein the high voltage, lower power source fails to ionize the gap, which situation may occur when the servo has failed to maintain the gap distance at a constant value or a high impedance impurity has masked the gap 17. In this situation, the pulse generator supplies a pulse between times T5 and T7 which accordingly closes switch 28 during this period. At times T6, the switch timer 36 produces an output pulse to close switch 42 thereby supplying the low voltage, high power energy to the gap. However, with the gap in the substantially deionized state the voltage across the gap will follow the value of the high voltage source between times T5 and T6 and will drop to the value of the low voltage source V2 between times T6 and T8. This latter voltage remains constant until such time as the switch 42 is opened at time T8, wherein the voltage across the gap drops to substantially zero. It is to be noted that current flow is zero through the gap during both periods between time T5 and T6 when the high voltage is being applied and between time T6 and T8 when the low voltage source is being applied.

The two situations described above in connection with times T1 to T4 and T5 to 8 refer to two extreme conditions of the gap, that is, wherein the gap immediately ionizes and the voltage thereacross drops to a potential V3 in the first situation and wherein the gap never breaks down between the times T5 and T8 wherein the voltage across the gap will remain substantially constant at a high level V1. This constant voltage persists during the period when the high voltage is being applied and thereafter drops to a voltage V2 during the period when the low voltage source is being applied, the latter voltage remaining constant until the low voltage source is disconnected from the gap. However, in the normal situation, the gap will break down at some random time interval subsequent to the application of the high voltage source to the gap 17 through the switch 28.

This situation is represented and illustrated in the right-hand column of the voltage charge illustrated in FIG. 2 wherein it is seen that the pulse generator produces a pulse between times T9 and T12 to close switch 28, thus applying the high voltage, low power source to the gap 17. Normally the gap will break down during the period T9 to T11 and the initial breaking down of the gap has been illustrated as commencing at time T10. This breakdown continues until the normal ionization voltage is achieved across the gap, which has been illustrated as subsequent to the time T11. At time T11, the switch timer produces a delayed pulse to close switch 42. Accordingly, the low voltage, high power source is connected across the gap to cause the desired metal removal from the workpiece 16. The gap voltage will drop to zero at such time as the switch 42 is opened by the cessation of the pulse to hold switch 42 in a closed position.

As is apparent from inspection of FIG. 2, should the switch 42 be closed while the voltage across the workgap 16 is still above the output voltage of the source 22, the source 22 tends to attenuate or limit the voltage impressed across the workgap. This is highly undesirable since the attenuating effect may prevent ionization of the gap under certain operating conditions and thereby reduce the machining time. Accordingly, referring back to FIG. 1, to prevent the high voltage available from the source 20 from being attenuated by the source 22, a unidirectional conducting device, specifically a diode 50, may advantageously be connected in series with the source 22 to act as a voltage sensitive switch. More particularly, as shown, the diode 50 is back biased to prevent conduction through the source 22 until the gap voltage drops below the output voltage of the source 22, at which time the diode 50 becomes forwardly biased. Of course, the diode 50 may be used either with or without the switch timer 36.

Referring now to FIG. 3, there is illustrated a schematic diagram of an electrode discharge machining apparatus which is generally of the same type as that illustrated in FIG. 1. It will be noted that the pulse generator 24 is connected in operative relation to the switch 28 by means of conductor 26 to thereby control the operation of the switch 28 in accordance with the output of the pulse generator 24. The output of pulse generator 24 is also fed to a switch timer 36 by means of conductor 38 which in turn feeds a timed pulse delayed from that impressed on switch 28 by predetermined length of time, this latter pulse being adapted to actuate switch 42. With switch 42 closed, the high power source 22 is connected in circuit with the gap 17 to provide low voltage, high power electrical energy to the gap to remove material from the workpiece 16.

The high voltage source 20 is connected to the gap 17 through the switch 28 and a coupling circuit 52 which generally comprises a pulse transformer 54 and an RC coupling circuit 56. The transformer 54 includes a primary winding 60 connected to the high voltage source 20 through conductors 30, 32 and also includes a secondary winding 62 connected to the tool electrode 18 by means of a conductor 64 and to the workpiece 16 by means of a conductor 66. The RC coupling circuit 56 includes a capacitor 68 in series with the secondary winding 62 of the transformer 54 and further includes a resistor 70 which is connected in shunt relation to the capacitor 68. The capacitor 68 precludes the possibility of a direct current shorting of the gap and the resistor 70 is employed to discharge the condenser between successive pulses. The main input pulse to the gap 17 from the high voltage source 20 is provided across the low power transformer 54.

FIG. 3a illustrates another coupling circuit which may be utilized in the circuit of FIG. 3 in lieu of the coupling circuit 52, wherein an RC coupling circuit 74 is inserted in the line between conductors 30 and conductor 64. The coupling circuit 74 comprises a capacitor 76 and a resistor 78 in shunt therewith. The conductor 32 is connected directly to the workpiece 16, as was the case with the circuit diagram of FIG. 1. In this situation a direct current shorting of the gap 17 is similarly precluded.

FIG. 4 illustrates another method of pulsing the gap 17 from the high voltage source 20 wherein a pulse-forming transformer 80 is utilized to interconnect the high voltage source 20 to the gap 17. The transformer 80 generally comprises a primary winding 82 connected to the high voltage source 20 through the switch 28. The primary winding is magnetically coupled to a secondary winding 84 in series circuit with the gap 17 and the high power source 22 and the second switch 42. A pulsing generator 24 is provided, as in the systems of FIGS. 1 and 3, while the switch timer 36 has been eliminated. Thus, when the pulse generator provides an output signal, the switches 28 and 42 are closed and the high voltage source 20 is magnetically connected to the gap 17 through the transformer 80. When the gap 17 ionizes, the high power source 22 provides material removing current to the gap through the switch 42.

Referring now to FIG. 5, there is illustrated still a further modification of the original circuit illustrated in FIG. 1. In FIG. 5 the same high voltage source 20 is provided in addition to the high power source 22, both of which are adapted to feed the tool electrode 18 and the workpiece 16 through a gap 17, in a predetermined sequence. The objective in the circuit of FIG. 5 is to provide an extremely fast acting current cutoff circuit to remove the high power source 22 from the gap 17 in the event a short circuit occurs across the gap. This current cutoff is achieved without the necessity for averaging several pulses before disconnecting the high power source current from the load in the event of a short circuit across the gap 17, as is the case in certain prior art systems.

As in the previously described circuit diagrams, a pulse generator 134 provides an actuating pulse to a switch member 136 by means of a conductor 138. Accordingly, each time a pulse is generated by the pulse generator 134, switch 136 is closed to feed a high voltage from source 20 to the gap 17. The output pulse from the pulse generator 134 is also fed to an "and" gate 140 which is connected in controlling relation to a second switch 142 by means of a conductor 144. Thus, an output signal from the "and" gate 140 will effect a closure of the switch 142 to connect the high power source 22 to the gap through a diode 148. As in the above situation, the diode 148 effects an isolation of the DC power source 22 from the load during the period when the gap 17 is being ionized. Thus, the impedance of the gap 17 is kept at a high level until the ionization occurs and also allows the high voltage source 20 to remain across the gap 17 during the entire period of the time that the high power source 22 is switched on and the gap 17 is not ionized.

Referring back to the "and" gate 140, the pulse from the pulse generator 134 is fed as a first input to the "and" gate by means of a conductor 150, and a second input to the "and" gate is provided on a conductor 152 connected to a switch timer 154. The switch timer receives a pulse from the pulse generator at the same time that the switch 136 is closed and provides a delayed output pulse to the "and" gate. Thus the operation of the switch 142 is controlled so that it is closed at some period later than the switch 136.

A short circuit sensing circuit is connected to the gap, the sensing circuit taking the form of a reference voltage circuit 160 which is connected to the tool electrode 18 by means of a conductor 162. The output of the reference voltage circuit 160 is connected to a third input circuit of the "and" gate 140 by means of a conductor 164. The reference voltage circuit is preoriented to sense the voltage across the gap 17 and provide an output signal when this voltage drops below a predetermined level. The output signal from the reference voltage circuit 160 switches "and" gate 140 to the off state thereby turning off the signal maintaining the switch 142 closed. When the short circuit condition at gap 17 is cleared and the voltage across tool electrode 18 and workpiece 16 rises above the reference voltage, the signal on conductor 164 returns to the "on" state, and the "and" gate produces a closing signal for the switch 142 if the signals on conductors 150 and 152 are also in the "on" state. Thus an extremely fast acting switching arrangement has been provided to open switch 142 at such time as a short circuit condition exists at the gap 17. In this manner, the possibility of the workpiece being destroyed or marred due to a short circuit is alleviated and the "off" signal for the "and" gate 140 is continuously applied until such time as the gap 17 is cleared.

Referring now to the circuit diagram of FIG. 6, there is illustrated a further improvement of the multiple power source concept utilized in feeding a single electro-discharge machining load. Specifically a pulse generator 230 is provided which generates a plurality of controlled periodic pulses for controlling the energy fed to the tool electrode 18 and workpiece 16 forming the gap 17. As will be seen from a detailed description of FIG. 7, the pulse generator is preferably of the type wherein the duty cycle of the pulses are controlled and wherein the duty cycle setting is variable but insensitive to amplitude changes in the pulse generator. The pulse generator is chosen to have a frequency range of approximately 100 cycles to 500 kilocycles, since the normal operating range of frequencies for rough to finishing cuts is of the order of 500 cycles to 100 kilocycles.

It is to be understood that this range may be varied to either a higher or a lower frequency range, the wide variance of frequencies being required due to the fact that low current applications, such as in the fine finishing process, a high frequency is required, and during the high removal rate process which takes place at a high current rate, it is necessary to use low frequencies for the desired results. As a further consideration in choosing a particular frequency to be utilized in the EDM process, consideration must be taken of the deionization time of the particular gap being utilized, the particular characteristics of the removal rate, the characteristics of the material removal and the heat generated in the gap during the electro-discharge machining process. Further, in a system of this type, a variable duty cycle source is desireable wherein the operator is able to vary the duty cycle from approximately 5% to 95%.

The output of the pulse generator 230 is fed to an initial firing pulse circuit and a secondary high voltage firing circuit by means of a conductor 232. Referring first to the initial firing circuit, the signal on conductor 232 is fed through a differential circuit 234 to a firing pulse amplifier 238. The firing pulse amplifier is adapted to produce a high voltage pulse, of the order of one microsecond in duration, to initially break down the gap through the ionization process described above. The output of the firing pulse amplifier is fed to the gap 17 by means of conductors 240, 242 and 244 and the tool electrode 18. The firing pulse amplifier, in the preferred embodiment, is adapted to produce a one ampere pulse for a duration of one microsecond at a high voltage of approximately 120 volts. Thus, the gap is initially, partially or perhaps completely ionized from this pulse.

The output of the pulse generator is also fed to a high voltage switch circuit 250 by means of conductor 252. The output of the high voltage switch circuit 250 is fed to the tool electrode by means of a conductor 254, the conductors 242, 244 and the tool electrode 18. The output of the high voltage switch circuit, in the preferred embodiment, is of the order of 120 volts to further assure the gap breakdown or ionization, and further supplies a small current through the gap in the event of a short circuit condition due to burrs or other high metal particles in the gap, as will be more fully explained later. Briefly, a short circuit condition in the gap normally occurs due to a high point in the finish of the workpiece 16 surface. Accordingly, in a circuit where a high current condition sensor 332 is provided which is adapted to cut off the main current flow through the gap 17, a small secondary current is desirable to erode away the burr on the surface of the workpiece 16. Accordingly, the high voltage switch 250 provides this additional low amplitude current to rid the gap and the workpiece 16 of the burr.

At the same instant time that the pulse on conductor 232 is fed to the firing pulse amplifier 238 and the high voltage switch circuit 250, an identical pulse is fed to an "and" gate 258 by means of a conductor 260. The "on" signal fed to "and" gate 258 by conductor 260 will produce an "on" signal at the output of the "and" gate 258 provided the signal on a conductor 262 from a flip flop unit 264, to be hereinafter explained, is also in the "on" condition. Assuming that the "on" condition exists on conductor 262, an "on" signal will be impressed on conductor 268 and fed to the input of a monostable pulse inverter circuit 270, in the form of a Schmitt trigger inverter circuit, to produce an "off" signal at the output of the Schmitt trigger inverter. The output of the Schmitt trigger inverter, a conductor 272, is fed to an inverter amplifier 276 which inverts the "off" signal on conductor 272 and impresses the resulting "on" signal on a conductor 278. This "on" signal on conductor 278 is utilized in controlling the main power circuit 280 to supply high material removing current to the gap.

The foregoing description of the pulse "on" circuit allows at least one "on" pulse to proceed through to the main power circuit irrespective of the conditions of the gap insofar as a high current, low voltage condition exists. As will be seen from a further description of the circuit, the flip flop unit 264 is responsive to a low voltage or high current situation at the gap but requires the first pulse to proceed to the power switches 286 to become operative. Accordingly, if it is desired to inhibit the operation of the "and" gate in response to a low voltage condition at the gap, a third input to "and" gate 258 may be provided from the output of the Schmitt trigger 308 to the "and" gate 258 by means of a conductor 341. As will be more fully explained hereinafter, the Schmitt trigger provides an output "on" pulse in the event the voltage at the gap exceeds a predetermined minimum. With the output from the Schmitt trigger 308 being fed to the input of the "and" gate 258, the "on" pulse through the "and" gate will be inhibited until such time as the voltage at the gap rises above a prespecified level.

The main power circuit generally comprises a variable voltage source 282 which, in the preferred embodiment, is a source having a voltage range which is variable from approximately 15 to 40 volts D.C. and also is capable of supplying 200 amperes of current to the load. The source current through the gap 17 is controlled by power switch means 286, which is representatively illustrated as a power transistor, and in the preferred embodiment generally takes the form of a bank of parallel connected power transistors. However, it is to be understood that any fast acting switch means may be utilized, such as tubes or the like. As described in conjunction with FIG. 1, a blocking rectifier means 290 is provided in series circuit with a variable voltage source 282, the power switch means 286, and the gap 17, for the purpose described above. That is, when the voltage across the gap as supplied from conductor 244 is above the variable voltage 282, the diode 290 will be back-biased until such time as the gap is sufficiently ionized to lower the gap voltage to a level below the setting of the variable voltage source 282. When this ionization process occurs, the diode 290 will be forward biased and the main current supply will be provided by the variable voltage source 282.

Thus, with the gap 17 ionized by means of either of the firing pulse amplifier 238 or the high voltage switch circuit 250, or both, and the diode 290 forward biased, the main current will flow from the variable voltage source 282 through the gap 17 by means of conductors 292 and 294 during the period that the power switch means 286 is energized by an "on" pulse conductor 278. At this time the main metal removal from the workpiece 16 will occur and will continue as long as the pulse on conductor 278 persists. However, certain gap condition sensors have been provided to protect the workpiece and the circuitry of the system in the event that a low voltage or high current condition exists. These sensors are adapted to provide a cut-off feature for the system during the period that these conditions are present at the gap 17.

Referring first to the voltage sensing system, a voltage sensing circuit 300 is connected in parallel circuit with the gap 17 by means of conductor 244 and 242 to provide a signal voltage which is indicative of the voltage at the gap 17. This signal voltage is compared to a reference voltage generated by a reference voltage circuit 302 and an error signal is produced on conductor 306. This error signal is unidirectional in nature and is substantially on during the period when the gap voltage exceeds the preselected reference voltages. However, when the gap voltage drops below the reference voltage, as in a short circuit or other type of low voltage conditions, the error signal will not be sufficient on conductor 306. This error signal, in the form of a sufficient (above the reference voltage) or deficient (below the reference voltage) nature, is fed to a pulse forming circuit 308, in the form of a Schmitt trigger in the preferred embodiment.

A deficient error signal on conductor 306 provides an input to set the Schmitt trigger to the "off" condition wherein an off signal is impressed on conductor 310 for the length of time the defficiency exists. Conductor 310 also forms an input to a first "or" gate 312, and a second input is provided to "or" gate 312 by means of a conductor 316 connected to the output conductor 272 of a Schmitt trigger inverter 270. As was stated above, the Schmitt trigger inverter goes from an "on" state to an "off" state during the period in which the pulse generator is feeding an "on" signal. Accordingly, if an "off" signal exists on either conductor 310, due to a low voltage condition, or on conductor 316, due to a pulse "on" condition at the Schmitt trigger inverter 270, then the "or" gate 312 will produce an "off" signal on output conductor 320. This conductor 320 provides an input signal to a "not" circuit 322 which inverts the output signal on conductor 320 and provides the signal as an input to an "or" gate 326 by means of a conductor 328.

The "or" gate 326 is provided with a second input signal from a conductor 330 connected to a current sensor circuit 332 which is adapted to sense the current flowing in the main metal removing circuit 280. The current flowing through the current senser circuit 332 is compared to a reference current signal provided by a reference circuit 336 and an error signal is poduced on conductor 330 which is indicative of the rise of the main current above the level preselected by the reference circuit 336.

The output of the "or" gate 326 is connected to the set side of the flip flop unit 264 by means of a conductor 340, so that the output signal from "or" gate 326 is provided to set the flip flop unit in its off state (line 262) in the event an "on" signal is present on conductor 340. This "on" signal will be generated on conductor 340 in the event that either of the signals on conductors 328 or 330 are in the "on" condition as described above.

Thus a set signal is fed to switch the flip flop 264 and the output signal level of the flip flop on conductor 262 will revert to the "off" condition to inhibit the operation of the "and" gate 258. This inhibiting of the "and" gate 258 will continue until the next pulse is received from the pulse generator 230, this pulse being fed to a differentiating circuit 344. The output of the differentiating circuit 344 is impressed on the reset side of flip flop 264 by means of a conductor 346 to reset the conditions in the flip flop and remove the inhibit sginal to the "and" gate 258. Thus the power switch will again be turned on after the removal of either the under-voltage condition or a current overload condition at the gap.

Assuming that the ionizing pulse from the pulse amplifier 238 does not break down the gap, the above described circuit provides a condition at the gap wherein a voltage of approximately 120 volts is applied to the gap through the high voltage switch circuit 250, as actuated by the pulse generator 230, and this high voltage remains on during the complete pulse "on" time. Since the pulse is fed through to the power switch 286 because of the fulfilled "on" conditions at the "and" gate 258, that is, both inputs on conductors 260 and 262 being in the "on" condition, the cutting current may act at any instant during the pulse "on" time whenever the gap ionizes sufficiently during this time period to forward bias the blocking rectifier 290. Accordingly, the gap conditions automatically provide a switching signal to the blocking rectifier 290 to enable the main power source 282 during the period when the pulse generator is providing a pulse "on" signal to power switching means 286. Thus the operation of the electro-discharge machining system may proceed in the fastest possible time, consistent with the gap 17 conditions.

Referring now to FIGS. 8a, 8b and 8c, there is illustrated a detailed circuit diagram of the power supply shown in block diagram form in FIG. 6. FIG. 7 is a wave form diagram of the output signals of the pulse generator, to be described in conjunction with FIG. 8a, and will be referred to upon the completion of the description of the pulse generator.

Referring particularly to FIG. 8a, there is illustrated one portion of the control system for supplying pulses to the gap in an electro-discharge machining process. For purposes of simplicity, the description will proceed in accordance with the normal flow of electrical energy to the gap. As was stated above, it is highly desirable for best machining results, to be able to control the frequency of operation, the duty cycle, the current through the gap, the voltage across the gap and the amount of leakage current passing through the gap during the period when the operator is attempting to remove a high spot or burr causing a short circuit condition. Furthermore, it is desirable to enable the operator to vary each of the conditions independently of one another to achieve an optimum operating point for each of the electrical characteristics for any given metal. In this way the best machining results are obtained on the finished product. In the case of the frequency, it is desirable to enable the operator to vary the frequency from approximately 100 cycles per second to 500 kilocyles per second frequency range, and also to vary the duty cycle from approximately 5% to 95%.

The system of the present invention has been provided with a pulse generator which is capable of being varied in frequency within a range in accordance with signal generators which are available. Thus, a pulse generator 350 is provided having an input source 352, which takes the form of a sinusoidal source or other source which could include a unidirectional source, provided by a signal generator having the desired frequency range. The output of the signal generator is fed through a current limiting resistor 354 to a voltage doubling, full wave rectifying circuit comprising a first diode 356 and capacitor 358 for one-half of the cycle, and a second diode 362 and capacitor 364 for the other half of the cycle.

Accordingly, when the signal generator 352 is going through half a cycle, assuming for example the positive half cycle, the current will flow through resistor 354, a conductor 366, the diode 356, a conductor 368, the capacitor 358, a conductor 370 back to the source 352. On the negative half cycle, the current will flow from the source 352 through the conductor 370, the capacitor 364, the diode 362, the conductor 366 and the limiting resistor 354 back to the suorce 352. As will be noted from the above description, the capacitors 358, 364 are charged in an aiding manner to produce a voltage doubling effect whereby an output voltage is produced across a load resistor 372. This output voltage is approximately double in amplitude as compared to the amplitude of each half wave of the pulses being produced by the source 352.

The load resistor 372 is associated with a slider 376 and a resistor 378 to form a variable voltage divider for varying the reference of the rectified output voltage across resistor 372 which is desired to be used by the operator. This D.C. output voltage is algebraically added to the sinusoidal A.C. output of the source 352, that is, the voltage at conductor 366, by means of a conductor 380 and resistor 382. A resistor 383 is connected in shunt across the source 352 to establish a control reference potential at the center of the resistor 372. Thus, the center of resistor 372 represents zero level. Both the resistors 382 and 372 are preferably chosen to be greater than the value of the resistor 354. Thus, the operator, by varying the setting of potentiometer 379, will vary the D.C. reference level, above and below zero, for the A.C. sinusoidal voltage appearing on conductor 380 which effectively varies the portion of the sinusoidal wave which is above the D.C. reference level. Accordingly, for a zero voltage setting of potentiometer 379, the output wave between resistors 382 and 378 will be symmetrical about a zero volt or the time axis on a voltage versus time curve. However, if the output voltage is made more positive, the greater portion of the wave will be above the time axis and less below the time axis. Similarly, if a negative D.C. potential is added to the alternating wave, a greater portion of the wave will appear below the time axis than will above the time axis. Thus by changing the setting of the potentiometer 379, the reference level of the output wave form can be raised or lowered with respect to the time axis, both positively and negatively.

The output wave form between a node 386 and a second node 388 is impressed on a transistor 390 and a diode 392, the base-emitter circuit of the transistor 390 being connected in parallel with an oppositely poled diode 392.

As will be appreciated, the transistor 392 switches between its conductive and nonconductive states as its base-emitter junction is forwardly and reversely biased, whereas the diode 394 protects the base-emitter junction of the transistor 392 from having an excessively high reverse bias applied thereacross. Thus, the transistor 394 produces output pulses at a frequency or repetition rate determined by the frequency of the input signal supplied by the signal source 352 and with a duty cycle determined by the setting of the potentiometer 379. It is to be noted that the circuit described above is voltage compensated and does not vary as the source voltage varies due to the fact that while the alternating potential from the source 352 may vary, the corresponding D.C. voltage will also vary a corresponding amount to maintain a constant amplitude swing output signal. Thus the portion of the wave above the reference voltage as compared to the portion of that below the reference potential will remain substantially constant and produce a constant duty cycle output signal for a preselected setting of the potentiometer 379.

A representative illustration of the wave forms of the output pulses from the pulse generator 250 is illustrated in FIG. 7. The sinusoidal wave to the left of the figure is representative of the signal from the generator 352 and the center diagram is representative of the range of D.C. levels which may be added to the sinusoidal wave. The diagram to the right of the figure illustrates the pulses produced by the transistor 390 for an exemplary duty cycle of about 25%. As can be seen, in this instance, the pulses are formed by a clipping-type action afforded by the transistor 390 and the diode 392, which is dependent upon the bias applied to the transistor 390 and diode 392, indicated in FIG. 7 as the clipping bias.

Of course, since the input signal supplied by the source 352 is, in this instance, an A.C. signal, the pulses provided by the transistor 390 do not have the desirable steep wave front. For this reason, the pulses produced by the transistor 390 are fed by a conductor 394.

To this end the output pulses of conductor 394 are fed to a monostable pulse forming circuit 400, which is representatively illustrated in the form of a Schmitt trigger. As is well known, the output of the Schmitt trigger is of constant amplitude and rises sharply to the constant level at such time as the input pulse reaches the trigger level. Thus, when the input pulse rises to the predetermined level which will switch the monostable circuit to its unstable state, an output pulse will be produced which rises sharply to a predetermined level and remains at that level until such time as the input pulse drops below the trigger level, thus switching the monostable circuit back to its stable state. The current for the transisor 390 is supplied through a plurality of resistors 402, 404 and the output pulse from the transistor 390 is fed to the monostable circuit 400 through a conductor 408. In the preferred form of the monostable circuit, a normally conducting transistor 410 and a normally non-conducting transistor 412 are connected in a conventional Schmitt trigger configuration wherein the colelctor electrode 414 of the transistor 410 is connected to the base electrode 416 of the transistor 412 through an RC coupling circuit 418.

The emitter electrode 420 of transistor 410 and the emitter electrode 422 of transistor 412 are connected to a common resistor 424 which is in turn connected to a zero reference potential on a conductor 426. The base electrode 416 is connected to the same source of zero potential through resistor 428 and the base electrode 430 of transistor 410 is connected to conductor 426 through a diode 432. The collector emitter current flow is supplied for transistor 410 through a collector load resistor 436 and the collector emitter current for transistor 412 is supplied through a collector load resistor 438, both resistors being connected to a common positive source of potential connected to a conductor 440. The output of the monostable circuit 400 is impressed on a node 444, this output serving as an input signal for various portions of the system, as will be hereinafter explained.

The conduction of transistor 412 also causes current to flow through the emitter-base circuit of a transistor 448 through a resistor 450. The emitter electrode 452 of transistor 448 is connected to the conductor 440 and the base electrode 454 is connected to the resistor 450. A diode 456 is connected across the emitter-base circuit of transistor 448 to protect the emitter-base junction against excess voltages which may damage the junction. The base electrode 454 is connected to a source of 18 volt positive potential through a resistor 458. The output of transistor 448 is connected through the collector electrode 460 and a conductor 462 to an amplifier-differentiating circuit 464, illustrated in FIG. 8b. The amplifier-differentiating circuit 464 along with a pair of NPN transistors 466 and 468, form a biasing network for a pair of high voltage, low current, low power tubes 470, 472 which form the high voltage switching circuit and the firing pulse amplifier, respectively.

The signal on conductor 462 is fed through a resistor 474 to the base electrode 476 of a normally conducting transistor 477. An emitter electrode 478 of the transistor 477 is connected to a conductor 480 which is in turn connected to the positive terminal of a direct current source of potential 484. A collector electrode 486 is connected to a differentiating circuit 487 comprising a differentiating capacitor 488, a diode 490 and a resistor 492, which elements form the main portion of the differentiating circuit 487. The lower end of resistor 492 is connected to the negative terminal of the direct current source 484 through a conductor 494. The output of the differentiating circuit is fed to the transistor 468 by means of a diode 498 and conductor 500 connected to the base electrode 502, the diode 498 selecting the negative spike from the differentiating circuit 487 to turn the normally conducting transistor 468 to the nonconducting state.

The conducting collector-emitter circuit of transistor 468 is connected to the source of D.C. supply 484 by means of a resistor 506 and diode 508 connected to the conductor 480, and the emitter 510 is connected to the conductor 494. The collector 512 is connected through a conductor 514 to the grid circuit of a firing pulse amplifier tube 472, thereby controlling the conduction of the tube 472. Thus, as the negative pulse through diode 498 and base electrode 502 causes transistor 468 to revert to the nonconductive state, the voltage level at collector 512 will be raised to a more positive level than the voltage at the collector 512 during the period when the transistor is conducting. The base-emitter current for transistor 468 is supplied through a diode 518 connected to the source of potential 484 through resistor 506. Also a diode 520 is provided to protect the base-emitter circuit of the transistor 468, and a similar diode 522 is provided to protect the base-emitter circuit of the transistor 477 against reverse voltages.

Referring to the firing pulse amplifier, which is initially utilized in charging the gap, it is seen that the cathode-plate circuit of tube 472 is connected in series with a source of high voltage direct current potential 526 and the workgap 17. Specifically, its plate 528 is connected to the positive terminal of the source 526 through a conductor 530 and its cathode 532 is connected to the tool electrode 18 through a conductor 534 and a resistor 536. The workpiece 16 is connected through a conductor 538 and a variable source of potential 540 to the negative terminal of the high voltage source of potential 526 through a conductor 542. Thus the triode 472 acts as a switch to selectively connect the sources of potential 526 and 540 across the gap 17 in response to the conductive condition of transistor 468.

Referring to the grid circuit of triode 472, it is seen that the collector electrode 512 of transistor 468 is connected to the grid 546 through a resistor 548 and a second resistor 550. When the transistor 468 is rendered nonconductive by the signal from the differentiating circuit 464, the collector voltage will rise to a higher potential than the potential of the collector electrode with the transistor 468 conductive. Thus the tube 472 will be rendered conductive to impress potential of sources 526, 540 across the gap to cause the gap to ionize. In the event the grid current reaches a higher value than that desired, a diode 554 has been provided to shunt a portion of the curernt.

Referring now to the high voltage switch circuit, which is utilized in maintaining the gap at a high voltage in the event the gap does not ionize upon application of the firing pulse amplifier, it is seen that the transistor 466 is connected in grid controlling relation with the tube 470. The pulse produced when the transistor 477 is switched to its non-conductive state is applied to the base-emitter circuit of normally conducting transistor 466 to render the transistor nonconductive and thereby drive the grid circuit of the tube circuit 470 more positive than the grid was when the transistor 466 was in the conductive state. The pulse from transistor 477 is fed through resistor 560, the resistor being connected to the base electrode 562 of the transistor 466 through a diode 564. The main collector-emiter current is derived from source 484, through a resistor 566 and a diode 568, and the base emitter current for the normally conducting state of transistor 466 is provided through the diode 564 and the base electrode 562. The cathode of diode 568 is connected to the collector electrode 572 by means of a conductor 574, the diode 568 being utilized in preventing saturation of the transistor 466 as is well known in the art.

When the transistor 466 is rendered nonconductive by the negative going pulse, or the turning off of transistor 477, the voltage at the collector electrode 572 goes from a voltage very near the voltage present on conductor 494 to a more positive voltage, this voltage being impressed on the grid 580 of the high voltage switching tube 470 through a conductor 582 and a pair of resistors 584, 586. The tube 470 is provided with a plate electrode 587 connected to the source of potential 526 by means of conductors 588, 590, and the cathode 591 is connected to the tool electrode 18 by means of a resistor 592, a conductor 594 and the resistor 536. Thus, as the potential is being fed to the grid electrode 580 by means of conductor 582 goes to a more positive value, the tube will be rendered conductive thereby impressing the source of D.C. potential 526 and the variable source of D.C. potential 540 across the gap 17.

In certain situations the current being fed to the grid through resistors 584 and 586 may reach an extremely high level. Accordingly, a diode 600 and a Zener diode 602 are provided in the grid-cathode circuit of tube 470, whereby current flowing through a resistor 586 will provide voltage to break down the Zener diode 602, thereby establishing a grid bias and bypassing certain of the grid current to the cathode resistor 592. When the Zener diode 602 breaks down, the grid voltage closely follows the cathode voltage at the end of resistor 592. The Zener diode 602 is broken down essentially by the lower end of resistor 592 going more and more negative as a greater amount of current is conducted through the tube 470. Resistors 608, 610 are provided for tubes 472 and 470, respectively, and a diode 612 has been connected between the grid resistor 586 and the cathode 591 to prevent overdrive of the grid electrode 580. The switching of source 526 between the "off" and "on" states creates certain spikes in the circuit and a filter circuit 616 is provided which generally comprises a pair of capacitors 618, 620 to present a low impedance to the high frequency spikes generated in the gap circuit. A diode 622 is connected across the base-emitter circuit of transistor 466 to protect the circuit and the base electrode 562 is connected to a negative source of potential 623 through a resistor 624 to insure positive cutoff of transistor 466 during the period when transistor 477 is in the nonconductive state.

Once the gap 17 has been initially charged by means of the firing pulse amplifier including the tube 472 and subsequently ionized by means of the high voltage switch including the tube 470, it is necessary to switch into the gap circuit a low voltage, high current source to provide the metal removal energy required by the EDM process. As was stated above, the potential 540 has been made variable and has a low voltage, high current producing capability thereby enabling the tool electrode 18 and the voltage across the tool electrode 18 and the workpiece 16 to remove metal from the workpiece 16. In order to switch the high power source 540 into circuit with the gap, a plurality of high power, low voltage transistors 630 and 632 have been provided which are connected in parallel circuit with each other and in series circuit with the source 540 and the gap 17. Accordingly, when the transistors 630, 632 are rendered conductive, the low voltage source 540 will be impressed on the gap 17 to remove metal from the workpiece 16, provided the gap has been ionized.

As shown, a blocking diode 636 has been provided in series circuit between the switching transistors 630, 632 and the gap 17. Accordingly, if the gap 17 remains at a voltage level above the voltage level of the source 540, the diode 636 will be back-biased and the low voltage source 540 will be unable to provide current to the gap 17. This condition persists in spite of the fact that transistors 630 and 632 may have been switched to their conductive states. However, soon as the gap ionizes and the voltage across gap 17 drops to a level below the low voltage source 540, the diode 636 will be forward biased and metal removing current will flow through the gap 17.

The transistors 630 and 632 are fed from a main driving transistor 640 which may be individual to each transistor 630 or 632 or a single transistor 640 may be provided for all of the power transistors 630, 632 being utilized, as is illustrated in FIG. 8b. A biasing voltage of the proper polarity impressed on the base electrode 642 of transistor 640 will render the normally conductive transistor 640 nonconductive. The normally conducting transistor 640 will then cease conduction and the potential at its collector 646 will, therefore, drop to a value very close to the negative potential to which resistors 648 to 654 are connected. Accordingly, the base electrodes of transistors 630, 632 are rendered more negative and the transistors 630, 632 will be rendered conductive. Thus current will flow through collector resistors 656, 658 through the diode 636 to the gap 17 thereby removing metal from the workpiece 16.

Referring back to FIG. 8a, the pulse generator 350 also provides the pulses to switch the power transistors 630 and 632 to their conductive states, thereby providing the material removal current to the gap 17. These switching pulses are fed from the pulse generator 350 to the driver transistor 640 by means of a pulse-on circuit 670, which generally comprises an "and" gate 672, a monostable pulse forming circuit 674, an inverter 676 and an inverter amplifier 678. More specifically, the output of the Schmitt trigger 400 is fed through a resistor 682 to the base electrode 684 of a transistor amplifier 686. The emitter 690 of the transistor 686 is connected to the conductor 440 to provide emitter-collector current therefrom and the collector electrode 692 is connected to the cathode of a diode 694 forming one input to the "and" gate 672.

The diode 694 is connected between a positive source of potential, as for example, the potential at conductor 440, through a resistor 696, and is connected to a negative source of potential through a resistor 698. With the transistor 686 in the nonconductive state, the diode 694 is forward biased and current flows through resistor 696, diode 694 and resistor 698 to the negative source of potential. However, when the transistor 686 commences conduction, the cathode of the diode 694 is raised to a potential which is very near the potential of the conductor 440 thereby back-biasing the diode and blocking current flow therethrough. The "and" gate also is provided with a second input diode 700 which is connected in parallel with diode 694.

Assuming the diode 700 to be also back-biased or in the "on" condition, current flow from resistor 696 is blocked through the diodes and is directed to flow through a third diode 702. The "on" condition in the sense of diode 694 and 700 is when the diodes are both back-biased thereby precluding current from flowing through either diode 694 or 700. With current flowing through resistor 696 and diode 702, the monostable circuits 670 in the form of a Schmitt trigger is pulsed to the "on" condition wherein a normally nonconducting transistor 708 is rendered conductive and a normally conducting transistor 710 is rendered nonconductive. The current from diode 702 flows to the conductor 699 through a resistor 714. As was described in conjunction with FIG. 6, a third input diode (not shown) to the "and" gate 672 may be provided, the third diode being forward biased until the gap voltage rises above a minimum level. In that event the gap voltage must rise above the predetermined minimum before the "and" gate 672 is enabled.

The Schmitt trigger 670 is of the conventional type wherein transistor 708 is normally nonconductive and transistor 710 is normally conductive. When a pulse is received at the base electrode 720 of transistor 708, the transistor 708 is rendered conductive thereby rendering transistor 710 nonconductive to provide an output pulse at its collector electrode 728.

The output pulse provided by transistor 728 persists until such time as the input signal level drops below the trigger point of the Schmitt trigger, and the Schmitt trigger returns to its original state. The output pulse at the collector electrode 728 is fed to an inverter amplifier transistor 732 through a base electrode 734. The emitter electrode 736 of transistor 732 is connected to the conductor 440 and the collector electrode 738 is connected into the base-emitter circuit of an NPN transistor 742. Suitable bias resistors 744, 746, 748 have been provided to bias the respective transistors to which they are connected. The transistor 742 is rendered conductive due to the current flow through the emitter-collector circuit of transistor 732, this emitter-collector current flowing through the base-emitter, circuit of transistor 742. With the switching of transistor 732 to the nonconductive state, the base-emitter current of transistor 742 is cut off thereby rendering normally conductive transistor 742 nonconductive. The output or collector electrode 756 of transistor 742 is connected to a transistor 758 through a collector resistor 760. As in the above situation the collector-emitter current of transistor 742 provides the base 764, emitter 762 current for transistor 758.

The output of transistor 758 similarly provides the base 768 emitter 770 current for an output transistor 772, the collector electrode of which is conected through a resistor 776 to the output conductor 680 connected to the driver transistors 640, discussed above. Suitable collector load resistors 778, 780 have been provided in addition to a plurality of base-emitter junction protective diodes 782. A diode 784 has been connected between the juncture of resistors 778 and 780 and the collector electrode 786 of transistor 772. During the low conduction periods of transistor 772, the cathode of the diode 784 is sufficiently negative with respect to its anode that the diode 784 is back-biased. However, when the conduction of transistor 772 reaches a predetermined level, the diode 784 will be forward biased and part of the current flowing from the transistor 758 will flow through diode 784, thereby limiting the base-emitter current of the transistor 772.

Thus a train of periodic pulses is applied to the driver transistors and the power switching transistors in accordance with the frequency of the pulses being generated by the pulse generator 350. In this way the gap is pulsed with material metal removal current provided the other conditions at the gap have been met, such as initial charging and ionization of the gap so that the gap voltage has reached a predetermined level to forward bias the switching diode 636. Suitable protective diodes have been provided across the base emitter circuit of each of the above discussed transistors in order to provide proper protective features for the transistors. It will be noted that the output pulse at conductor 680 is of such polarity as to cut off the emitter-base current of driver transistor 640. As was stated above, transistors 732, 742, 758 and 772 are normally conducting and the output pulse from the Schmitt trigger-inverter combination is of such a polarity as to cause the transistors 732, 742, 758 and 772 to cease conduction, thereby cutting off the base-emitter current of driver transistor 640.

As was stated above, the "and" gate 672 is provided with a second input diode 700, which was assumed to be in the "on" condition in order to permit a pulse to pass through the Schmitt trigger 670 in response to the output pulse of the Schmitt trigger 400. The diode 700 is connected to a flip flop circuit 790 by means of a conductor 792. While the invention is described in conjunction with a flip flop circuit, it is to be understood any bistable circuit may be utilized in lieu thereof. The flip flop circuit generally comprises a normally conducting transistor 794 and a normally nonconducting transistor 796. The initial conditions in the flip flop circuit are set by means of a differentiating circuit comprising a resistor 798, and a capacitor 800 with the positive pulse from the output of the differentiating circuit flowing through a diode 802. The negative spike produced by the differentiating circuit is fed through a diode 804 to the base electrode 806 of transistor 796. This negative spike either switches transistor 796 to the nonconducting state if it is conducting, or is ineffectual if the transistor is already nonconductive.

As is common in the art, the collector electrode 808 of the transistor 796 is connected to the base electrode 810 of transistor 794 through an RC coupling circuit 812 for rapid switching. Thus, when transistor 796 is switched to the nonconducting state, the transistor 794 is switched to the conductive state, thereby switching the flip flop to its opposite stable state. Similarly, the collector electrode 816 of transistor 794 is connected to the base electrode 806 of transistor 796 through an RC coupling circuit 818. With the initial conditions of the flip flop set by means of the negative spike through diode 804, the output of the flip flop unit, the potential at collector electrode 808, is fed through a conducor 792 to the diode 700, thereby back-biasing the diode 700 and permitting the current from resistor 696 to flow through diode 702 and pulse Schmitt trigger 670. The transistors 794 and 796 are provided with collector load resistors 822 and 824 and positive turn-off resistors 826 and 828 are connected to the base circuits of the transistors 794, 796 respectively. The diodes 830 and 832, along with the resistor 834 and the voltage regulator diode 836, limit the maximum voltage that may be applied to the base emitter junctions of the transistors 794 and 796, and at the same time allow sufficient back bias to be applied there across to utilize the full turnoff speed inherent in the transistors 794, 796.

As was stated above, the initial conditions of the flip flop 790 are reset each time the pulse generator 350 produces an output pulse on conductor 797 and the condition of the flip flop 790 is fed to the "and" gate 672 to either inhibit or enable the "on" pulse to be fed to the driver transistors. However, provisions have been included in the flip flop circuit whereby the conditions of the flip flop circuit may be set due to an under voltage or over-current condition which are sensed at the gap. A signal indicative of either under voltage or over-current condition is fed to the flip flop units in a manner to be hereinafter explained to switch the flip flop unit to its opposite stable state thereby inhibiting the operating of the "and" gate and precluding the "on" pules from passing through to the Schmitt trigger 670.

Referring to FIG. 8c, there is illustrated a voltage sensing circuit 840, which is adapted to sense the gap voltage by means of a pair of conductors 842 and 844. The voltage sensing circuit generally comprises a pentode type tube 846 which is connected to a source of positive D.C. potential 848, as is common in the art. The input signal on conductor 844 is fed through a diode 848, resistor 850 and a resistor 852 to the grid electrode 854 of tube 846, by means of a conductor 856. The voltage between conductors 856 and 842 is impressed across a series combination of a diode 860 and a Zener diode 862 to provide a grid bias voltage to render the tube conductive in the case of a normal voltage condition and nonconductive during a low voltage condition. The Zener diode 862 is in circuit to provide a constant reference source of potential for the grid electrode 854. This reference voltage is established by the connection of the Zener diode 862 to the source of potential at conductor 876 through Zener diode 870. At such time as the Zener breakdown voltage is exceeded between conductors 856 and 842, the grid 854 potential is established. At such time as the Zener breakdown voltage is exceeded, the grid electrode 854 is maintained at a constant bias voltage due to diode 860 which is more positive than the potential of the grid prior to the breakdown of Zener diode 862. Thus the tube is maintained at a conductive state above the Zener voltage without overdriving the tube. When a predetermined low voltage condition exists at the gap, an insufficient voltage is applied to the grid 854 to maintain the conduction of tube 846 and the tube will cease conduction to provide a low voltage condition signal at the plate electrode.

The pentode is provided with a constant voltage screen grid 880 source by means of a diode 870 which is connected in circuit with the screen grid by means of conductor 872. The source of potential to the Zener diode is fed by means of a conductor 876 and a resistor 878 connected to a positive source of D.C. potential, as for example the 120 volts, which provides a constant bias for the screen grid of pentode 846. A suppressor grid is connected to the cathode as is common in the art. It is to be noted that the resistor 882 provides a charging current for the Zener diode to maintain the Zener voltage. An inherent short circuit delay has been provided in the voltage sensing circuit in the provision of a capacitor 888 and a resistor 890, the capacitor-resistor circuit being connected in parallel across the source of voltage sensing signals.

The output of the plate of tube 846 is connected to a monostable circuit 900, which may take the form of a Schmitt trigger by means of a conductor 902. The Schmitt trigger generally comprises a first transistor 904 normally at one state and a second transistor 906 normally at an opposite state, as is common in the art. Suitable interconnection between transistors 904 and 906 has been provided with a reactive coupling circuit 908, in the form of a resistance-capacitance coupling circuit, wherein the collector 910 of the transistor 904 is connected to the base 914 of transistor 906 by the RC coupling circuit 908. Suitable collector resistors 916 and 918 have been provided to provide collector-emitter current to the transistors 904 and 906. As is common in the art, the emitter electrodes 920, 922 have been connected together through a common resistor 924 to a less positive potential than that present at the collector electrodes. The output pulse at the collector electrode 927 due to the switching of transistor 906 to its opposite state is fed to the base electrode 928 of transistor 930 through a resistor 932, thereby switching transistor 930 to its opposite state. With both transistors 904, 906 in the opposite states to the normal stable state, the Schmitt trigger 900 produces an output pulse according to the duration of the input pulse. In the representative illustration, the transistor 904 has been normally biased in the conductive state and the transistors 906, 930 are biased in the nonconductive state. In this representative illustration, the output pulse of the Schmitt trigger 900 in response to a sufficient voltage condition tends to forward-bias the emitter-base circuit of the transistor 930 to switch the transistor 930 to the conducting state. The output of transistor 930 is fed from the collector electrode 936 to an output terminal 938, which is applied to one input terminal of a gate circuit 944.

Referring once again to FIG. 8a, the output signal provided on conductor 938 in response to a low voltage condition is fed to the gate 944, and particularly to a diode 948. The gate 944 also includes a second diode 950 which is connected to the output of inverter transistor 732 by means of a conductor 952 and a delay network 954. The inverter output delay circuit 954 generally comprises a resistor 958 and a capacitor 960, so that the decay of the signal decay from the Schmitt inverter circuit 670 is delayed slightly to allow the signal being fed from the voltage sensing Schmitt circuit 900 to become apparent. This delay is included in the circuit so that the pulse from the Schmitt inverter does not decay for the gate 944 prior to the time that the voltage sensing signal should normally be present on conductor 938, due to the inherent propagation time of the voltage sensing signal in response to the voltage at the gap.

The gate 944 has been connected such that the presence of a low voltage signal on conductor 938 and the presence of an "on" pulse condition on conductor 952 due to the switching of the Schmitt trigger 670 to its unstable state will produce an "on" signal at output conductor 964 through a resistor 966. This output signal is fed to an inverter circuit in the form of a "not" gate comprising a diode 970 and a resistor 972. This inverted output signal is fed to a third gate 976 and specifically a diode 978. The presence of a signal at diode 978 due to the coincidence of a low voltage condition on conductor 938 and an "on" pulse condition on conductor 952 will switch the flip flop circuit 970 to its set state. The set state is that stable state which is opposite to the state of the flip flop due to the receipt of a pulse from the pulse generator circuit 350. Accordingly, the output pulse from the flip flop circuit on conductor 792 is fed to the "and" gate 672 by means of a diode 700 to inhibit the "on" pulse signal from passing through the Schmitt trigger 670. Of course, due to the delay circuit 954, the power transistors 630 and 632 are at least momentarily switched to their conductive states to switch the high power source 540 across the workgap 17. However, should an abnormally low gap voltage exist, the "and" gate 672 is disabled sometime after the delay established by the delay circuit 954 expires and the power transistors 630 and 632 are then returned to their non-conductive states.

The third gate circuit 976 also includes a second diode 980 which is fed from a current sensing circuit to be hereinafter explained. Accordingly, if the current sensing circuit senses an over-current condition, a signal pulse will be fed to diode 980 through an input conductor 982 thereby switching the flip-flop unit 790 to its set state. Again, with the flip-flop 790 in its set state, an inhibit signal will be fed to the "and" gate 672 through the diode 700 to inhibit the operation of the "and" gate 672.

The current through the gap 17 is sensed by means of sensing current flowing through the resistor 656 in series therewith and feeding this sensed current condition to a current sensing circuit 1000 by means of a pair of conductors 1002, 1004, the conductor 1002 being fed from the more positive side of resistor 656 and the conductor 1004 being fed from the more negative side. The input signal on conductor 1002 is fed through a current limiting resistor 1008, a second pair of resistors 1010, 1012, and a diode 1014 to a Zener diode 1020. The Zener diode 1020 is connected in the base-emitter circuit of a current sensing transistor 1022, which is normally nonconducting due to the lack of bias current flowing thereto. The positive cutoff of transistor 1022 during the nonconductive state is insured by a resistor 1024 connected to a suitable source of electrical energy. When the voltage across resistor 656 rises to a sufficient level, indicating an over-current condition, the Zener diode 1020 breaks down, providing base-emitter current to the transistor 1022. The conduction of transistor 1022 provides an output signal on conductor 982, which is connected to diode 980 in the third gate circuit 976. Thus the conduction of transistor 1022 due to an over-current condition will also provide a switching signal to the flip-flop 790 to reset the flip-flop and provide an inhibit signal to "and" gate 672 by way of diode 700.

A capacitor 1036 has been connected across the power transistor 630, 632 by means of a conductor 1038 and the conductor 1002 to form, with resistor 1008, a filter circuit to smooth out spikes which may be present in the load circuit. A diode 1040 and a resistor 1042 have been provided across the base-emitter circuit of transistor 1022 for protection purposes and a resistor 1044 has been connected to a positive source of DC potential at one end thereof and the Zener diode 1020 at the other end to provide a charging current for the capacitor junction of the Zener diode 1020.

In order to preclude a high order over-current condition from over-driving transistor 1022, a Zener diode 1050 has been provided in shunt relation to the current flowing through resistors 1012 and 1010. A diode 1052 has been provided in series with the Zener diode 1050 to preclude forward current from flowing through the Zener diode 1050 and a diode 1056 is connected in shunt relation to the diode 1050, 1052 combination to shunt the back voltage between conductors 1002 and 1004. A current limit resistor 1060 has been connected in series circuit in the conductor 1004.

If, for any reason, a short circuit occurs at the gap 17 before a pulse is applied to power transistors 630, 632, the voltage sensing tube 846 will remain in the off condition when the high voltage firing pulse is applied. However, as described above, the first gate circuit 944 will not pass a signal therethrough indicative of a short circuit condition until an "on" pulse is passed through the Schmitt trigger 670 and transistor 732.

However, as soon as the "on" pulse is lost from the gate 944, the flip-flop 790 will be switched to the set condition through the second gate comprising diode 970 and resistor 972, and the third gate 976. This permits a very short duration current pulse of a few microseconds to be fed into the short circuit each time the pulse generator is turned on. The time duration of the high current pulse is determined by the total propagation time of the stages in the "on" pulse train and the delay network 954.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A power supply for electrical discharge-type machining of a workpiece by passing successive pulses through a gap circuit including an ionizable gap defined between an electrode and said workpiece, said power supply comprising the combination of a first pulse operated switching means for selectively coupling a high voltage, low current source across said electrode and workpiece to thereby apply a voltage thereacross that is sufficient to ionize said gap, a second pulse operated switching means for selectively coupling a low voltage, high current source across said electrode and workpiece to thereby pass a current through said gap that is sufficient to remove material from said workpiece, a pulse generating means coupled to said first and second switching means for supplying control pulses to close said switching means, and gate means coupled between said pulse generating means and said second switching means for controlling the application of said control pulses to said second switching means.

2. The electrical discharge machining power supply of claim 1 further including means coupled to said second switching means to prevent said high current, low voltage source from being coupled across said electrode and workpiece until sometime after said high voltage low current source is coupled thereacross.

3. The electrical discharge machining power supply of claim 2 further including detection means coupled between said gap circuit and said gate means for disabling said gate means in response to an abnormal electrical characteristic in said gap circuit.

4. The electrical discharge machining power supply of claim 1 further including a unidirectional conducting means connected in series between said second switching means and said gap circuit and poled to block conduction through said second switching means until the voltage across said electrode and workpiece drops below the voltage of said high current, low voltage source whereby said high current, low voltage source is coupled across said electrode and workpiece only after a predetermined point in the ionization of said gap is reached.

5. The electrical discharge machining power supply of claim 1 further including detection means coupled between said gap circuit and said gate means for disabling said gate means in response to an abnormal electrical condition in said gap circuit.

6. The electrical discharge machining power supply of claim 5 wherein said gate means includes in "and" gate having one input coupled to said pulse generating means and another input coupled to said detection means, and said detection means includes a voltage sensitive cut-off circuit having an input coupled across said electrode and workpiece and an output coupled to said other input of said gate, said detection means disabling said "and" gate in response to the voltage across said electrode and workpiece falling below a predetermined level.

7. The electrical discharge machining power supply of claim 1 further including a timer circuit coupled between said pulse generating means and said second switching means whereby said control pulses are applied to said second switching means a predetermined time after they are applied to said first switching means.

8. The electrical discharge machining power supply of claim 7 further including a detection means coupled between said gap circuit and said gate means for disabling said gate means in response to an abnormal electrical condition in said gap circuit.

9. The electrical discharge machining power supply of claim 8 wherein said gate means includes an "and" gate having one input coupled to said timer circuit to receive said control pulses therefrom and another input coupled to said detection means, and said detection means includes a voltage sensitive circuit coupled to said gap circuit for disabling said "and" gate in response to the voltage across said electrode and workpiece dropping below a predetermined level.

10. The electrical discharge machining power supply of claim 9 further including a diode connected in series between said second switching means and said gap circuit, said diode being poled to be back biased until the voltage across said electrode and workpiece drops below the voltage of said low voltage, high current source to thereby prevent conduction through said low voltage, high current source until a predetermined point has been reached in the ionization of said gap.

11. The electrical discharge machining power supply of claim 1 further including a bistable circuit means coupled to said gate means, a differentiating means coupled between said pulse generating means and said bistable circuit means for resetting said bistable circuit means to a first stable state at the outset of each control pulse supplied by said pulse generaing means to thereby enable said gate means, and a detection means coupled between said gap circuit and said bistable circuit means for setting said bistable circuit means to a second stable state in response to the existence of an abnormal electrical condition in said gap circuit whereby said gate means is then disabled.

12. The electrical discharge machining power supply of claim 11 further including a diode connected in series between said second switching means and said electrode and workpiece, said diode being poled to block conduction through said second switching means while the voltage across said electrode and workpiece is above the voltage of said high current, low voltage source, whereby said high current, low voltage source is coupled across said electrode and workpiece only after a predetermined point is reached in the ionization of said gap.

13. The eelctrical discharge machining power supply of claim 11 wherein said gate means is an "and" gate having one input coupled to said pulse generating means and another input coupled to said bistable circuit means whereby said "and" gate is enabled in the presence of a control pulse when said bistable circuit means is in its first stable state, and said detection means includes a gap voltage sensitive circuit having an input coupled across said electrode and workpiece and an output coupled to said bistable circuit means for setting said bistable circuit means to its second stable state in response to said gap voltage dropping below a predetermined level.

14. The electrical discharge machining power supply of claim 13 wherein said detection means further includes a second gate means coupled between the output of said voltage sensitive circuit and said bistable circuit means, and a delay means having an input coupled intermediate said "and" gate and said second switch means and an output coupled to said second gate means for providing a signal to inhibit said second gate means during a predetermined initial portion of each of said control pulses to thereby prevent said "and" gate from being disabled in response to said gap voltage falling below said predetermined level during said inital portion of each control pulse whereby a burst of high current is passed between said electrode and workpiece even if said gap voltage is below said predetermined level.

15. The electrical discharge machining power supply of claim 14 further including a diode connected in series between said second switching means and said electrode and workpiece, said diode being poled to prevent conduction through said second switching means until the voltage across said electrode and workpiece drops below the voltage of said high current, low voltage source to thereby prevent conduction through said second switching means until a predetermined point in the ionization of said gap is reached.

16. The electrical discharge machining power supply of claim 11 wherein said gate means is an "and" gate having one input coupled to said pulse generating means and another input coupled to said bistable circuit means whereby said "and" gate is enabled in the presence of a control pulse when said bistable circuit means is in its first stable state, and said detection means includes a current sensitive circuit coupled between said gap circuit and said bistable circuit means for setting said bistable circuit means to its second stable state in response to the current between said electrode and workpiece rising above a predetermined level.

17. The electrical discharge machining power supply of claim 16 further including a diode connected in series between said second switching means and said electrode and workpiece, said diode being poled to prevent conduction through said second switching means until the voltage across said electrode and workpiece drops below the voltage of said high current, low voltage source to thereby prevent conduction through said second switching means until a predetermined point in the ionization of said gap is reached.

18. The electrical discharge machining power supply of claim 16 wherein said detection means further includes a voltage sensitive circuit having an input coupled across said electrode and workpiece and an output coupled to said bistable circuit means for setting said bistable circuit means to its second stable state in response to the voltage between said electrode and workpiece dropping below a predetermined level.

19. The electrical discharge machining power supply of claim 18 wherein said current sensitive circuit and said voltage sensitive circuit are coupled to said bistable circuit means through an "or" gate, whereby said bistable circuit means is set to its second stable state to disable said "and" gate in response to either the current between said electrode and workpiece rising above a predetermined level or the voltage therebetween dropping below another predetermined level.

20. The electrical discharge machining power supply of claim 19 wherein said detection means further includes a second gate means coupled between the output of said voltage sensitive circuit and said "or" gate, and a delay means having an input coupled intermediate said "and" gate and said second switching means and an output coupled to said second gate means for providing a signal to inhibit said second gate means during a predetermined initial portion of each of said control pulses to thereby prevent said "and" gate from being disabled in response to the voltage between said electrode and workpiece dropping below said predetermined value during said initial portion of said each control pulse, whereby a burst of high current is passed through said gap during each control pulse even if the voltage between said electrode and workpiece is below said predetermined level.

21. The electrical discharge machining power supply of claim 20 further including a diode connected in series between said second switching means and said electrode and workpiece, said diode being poled to be back biased until the voltage across said electrode and workpiece drops below the voltage of said high current, low voltage source to thereby prevent conduction through said second switching means until a predetermined point in the ionization of said gap is reached.

References Cited

UNITED STATES PATENTS

| | | |
|---|---|---|
| 3,052,817 | 9/1962 | Branker. |
| 3,158,728 | 11/1964 | Webb. |
| 3,243,567 | 3/1966 | Lobur. |
| 3,246,113 | 4/1966 | Scarpelli. |
| 3,292,040 | 12/1966 | Ullmann et al. |
| 3,399,288 | 8/1968 | Schierholt. |

RALPH F. STAUBLY, Primary Examiner

Dedication and Disclaimer 3,532,850.—*Hans J. Schulz*, Wuppertal-Vohwinkel, Germany, and *Victor H. Marcolini*, Cicero, Ill. POWER SUPPLY FOR ELECTRICAL DISCHARGE MACHINING. Patent dated Oct. 6, 1970. Disclaimer and Dedication filed June 5, 1975, by the assignee, *Amsted Industries Incorporated*.

Hereby disclaims and dedicates to the Public the remaining term of said patent.

[*Official Gazette July 22, 1975.*]